(12) United States Patent
Halcrow et al.

(10) Patent No.: US 11,494,216 B2
(45) Date of Patent: Nov. 8, 2022

(54) BEHAVIOR-BASED VM RESOURCE CAPTURE FOR FORENSICS

(71) Applicant: Google LLC, Mountain View, CA (US)

(72) Inventors: Michael Halcrow, Kirkland, WA (US); Thomas Garnier, Mountain View, CA (US)

(73) Assignee: Google LLC, Mountain View, CA (US)

( * ) Notice: Subject to any disclaimer, the term of this patent is extended or adjusted under 35 U.S.C. 154(b) by 608 days.

(21) Appl. No.: 16/542,897

(22) Filed: Aug. 16, 2019

(65) Prior Publication Data
US 2021/0049031 A1 Feb. 18, 2021

(51) Int. Cl.
| | |
|---|---|
| G06F 9/455 | (2018.01) |
| G06F 9/50 | (2006.01) |
| G06F 11/14 | (2006.01) |
| G06F 12/14 | (2006.01) |
| G06F 21/55 | (2013.01) |

(Continued)

(52) U.S. Cl.
CPC ........ G06F 9/45558 (2013.01); G06F 9/5077 (2013.01); G06F 9/5088 (2013.01); G06F 11/1469 (2013.01); G06F 12/1491 (2013.01); G06F 21/554 (2013.01); G06F 21/566 (2013.01); G06F 21/577 (2013.01); *G06F 2009/4557* (2013.01); *G06F 2009/45587* (2013.01); *G06F 2201/84* (2013.01)

(58) Field of Classification Search
CPC ............. G06F 9/45558; G06F 11/1469; G06F 12/1491; G06F 21/554; G06F 21/566; G06F 21/577
See application file for complete search history.

(56) References Cited

U.S. PATENT DOCUMENTS 9,223,962 B1 * 12/2015 Kashyap ................ G06F 21/52
9,524,389 B1 * 12/2016 Roth .................... G06F 9/45558
(Continued)

FOREIGN PATENT DOCUMENTS

WO 2014145571 A1 9/2014

OTHER PUBLICATIONS

International Search Report, PCT US2020/046463, dated Nov. 11, 2020, 16 pages.

(Continued)

*Primary Examiner* — Jason Chiang
(74) *Attorney, Agent, or Firm* — Honigman LLP; Brett A. Krueger

(57) ABSTRACT

A method for capturing VM resources for forensics includes receiving an indication of compromise (IoC). The indication of compromise indicates an attack is imminent against a virtual machine. The method also includes, in response to receiving the IoC and before the attack begins, snapshotting a memory state of memory used by the virtual machine and increasing a level of auditing of the virtual machine from a standard level of auditing to a heightened level of auditing. The heightened level of auditing generates data representative of all accesses to the memory used by the virtual machine. After the attack against the virtual machine has begun, the method includes maintaining the heightened level of auditing for a threshold period of time, notifying a user of the virtual machine of the indication of compromise, and storing the data in memory external to the virtual machine.

24 Claims, 9 Drawing Sheets

(51) Int. Cl.
*G06F 21/56* (2013.01)
*G06F 21/57* (2013.01)

(56) References Cited

U.S. PATENT DOCUMENTS

| | | | |
|---|---|---|---|
| 9,563,777 B2 | 2/2017 | Deng et al. | |
| 2007/0150957 A1* | 6/2007 | Hartrell | H04L 63/1425 |
| | | | 726/24 |
| 2007/0234337 A1* | 10/2007 | Suzuki | G06F 8/61 |
| | | | 717/168 |
| 2008/0016570 A1 | 1/2008 | Capalik | |
| 2009/0320137 A1* | 12/2009 | White | G06F 21/577 |
| | | | 707/999.102 |
| 2010/0251004 A1* | 9/2010 | Schuba | G06F 21/577 |
| | | | 718/1 |
| 2011/0265182 A1 | 10/2011 | Peinado et al. | |
| 2012/0124285 A1* | 5/2012 | Soran | G06F 11/1435 |
| | | | 711/E12.002 |
| 2013/0198139 A1* | 8/2013 | Skidanov | G06F 16/21 |
| | | | 707/649 |
| 2013/0332656 A1* | 12/2013 | Kandiraju | G06F 12/0246 |
| | | | 711/E12.008 |
| 2014/0259171 A1 | 9/2014 | Spikes et al. | |
| 2014/0380009 A1* | 12/2014 | Lemay | G06F 9/45558 |
| | | | 711/163 |
| 2015/0052614 A1* | 2/2015 | Crowell | G06F 21/53 |
| | | | 726/25 |
| 2015/0172300 A1* | 6/2015 | Coch | G06F 21/6218 |
| | | | 726/23 |
| 2017/0061126 A1 | 3/2017 | Hooks | |
| 2017/0093910 A1 | 3/2017 | Gukal et al. | |
| 2018/0077201 A1* | 3/2018 | Boutnaru | H04L 63/0263 |
| 2018/0152470 A1 | 5/2018 | Lu | |
| 2018/0159866 A1* | 6/2018 | Sheri | G06F 21/566 |
| 2018/0167403 A1* | 6/2018 | Smith | G06F 21/55 |
| 2018/0247055 A1* | 8/2018 | Curtis | G06F 21/554 |
| 2020/0034284 A1* | 1/2020 | Solan | G06F 9/45541 |
| 2020/0084229 A1* | 3/2020 | Areno | H04L 63/1441 |
| 2020/0092334 A1* | 3/2020 | Hiebert | H04L 41/0893 |
| 2021/0026675 A1* | 1/2021 | Hadas | G06F 9/45558 |

OTHER PUBLICATIONS

Chan et al. "An approach to high availability for cloud servers with snapshot mechanism," Proceedings of the Industrial Track of the 13th ACM/IFIP/USENIX International Middleware Conference on, Middleware '12, Dec. 3, 2012, 6 pages.

* cited by examiner

BEHAVIOR-BASED VM RESOURCE CAPTURE FOR FORENSICS

TECHNICAL FIELD

This disclosure relates to capturing behavior-based virtual machine (VM) resources for forensics.

BACKGROUND

Many third-party software services capture snapshots of a state of memory in a computing system for the purpose for recovering or analyzing a malicious software attack. Because modern computing systems may utilize a substantial amount of memory, these snapshots often consume considerable processing and memory resources. Additionally, the static nature of the snapshots only captures the delta between snapshots, thereby causing contention between the desire to capture snapshots at a high frequency to ensure a small delta and the desirability to maintain performance by minimizing the number of snapshots captured and stored.

SUMMARY

One aspect of the disclosure provides a method for capturing virtual machine resources for forensics. The method includes receiving, at data processing hardware, an indication of compromise. The indication of compromise indicates an attack is imminent against a virtual machine. In response to receiving the indication of compromise and before the attack against the virtual machine begins, the method includes snapshotting, by the data processing hardware, a volatile-memory state of volatile-memory used by the virtual machine and a non-volatile memory state of non-volatile memory used by the virtual machine and increasing, by the data processing hardware, a level of auditing of the virtual machine from a standard level of auditing to a heightened level of auditing. The heightened level of auditing generates data representative of all accesses to the volatile-memory used by the virtual machine and the non-volatile memory used by the virtual machine. After the attack against the virtual machine has begun, the method includes maintaining, by the data processing hardware, the heightened level of auditing for a threshold period of time, notifying, by the data processing hardware, a user of the virtual machine of the indication of compromise, and storing, by the data processing hardware, the data in memory external to the virtual machine.

Implementations of the disclosure may include one or more of the following optional features. In some implementations, snapshotting the non-volatile memory state includes suspending garbage collection of the non-volatile memory. Snapshotting the volatile memory state may include executing a live migration of the volatile memory. In some examples, the threshold period of time is configurable by the user of the virtual machine. Optionally, the indication of compromise is based upon existence of a suspicious process and the threshold period of time is based upon the existence of the suspicious process.

In some implementations, the threshold period of time corresponds to the life of the virtual machine. Optionally, the data further includes a list of all commands executed by the virtual machine during the heightened level of auditing. In some examples, the method further includes determining, by the data processing hardware, that the attack has concluded and in response to determining that the attack has concluded, snapshotting, by the data processing hardware, the volatile-memory state of the volatile-memory used by the virtual machine and the non-volatile memory state of the non-volatile memory used by the virtual machine.

Receiving the indication of compromise may include receiving the indication of compromise from an intrusion detection system executing on the data processing hardware. The intrusion detection system may execute in a first hierarchical protection domain and software resources within a user space of the virtual machine may execute in a second hierarchical protection domain. The first hierarchical protection domain has more privileges than the second hierarchical protection domain. In some examples, the first hierarchical protection domain corresponds to ring 0 of the virtual machine and the second hierarchical protection domain corresponds to ring 3 of the virtual machine. In some implementations, no snapshotting of the volatile-memory state of the volatile-memory and the non-volatile memory state of the non-volatile memory occurs while the attack against the virtual machine is in progress.

Another aspect of the disclosure provides a system for capturing virtual machine resources for forensics. The system includes data processing hardware and memory hardware in communication with the data processing hardware. The memory hardware stores instructions that when executed on the data processing hardware cause the data processing hardware to perform operations that include receiving an indication of compromise. The indication of compromise indicates an attack is imminent against a virtual machine. In response to receiving the indication of compromise and before the attack against the virtual machine begins, the operations include snapshotting a volatile-memory state of volatile-memory used by the virtual machine and a non-volatile memory state of non-volatile memory used by the virtual machine and increasing a level of auditing of the virtual machine from a standard level of auditing to a heightened level of auditing. The heightened level of auditing generates data representative of all accesses to the volatile-memory used by the virtual machine and the non-volatile memory used by the virtual machine. After the attack against the virtual machine has begun, the operations include maintaining the heightened level of auditing for a threshold period of time, notifying a user of the virtual machine of the indication of compromise, and storing the data in memory external to the virtual machine.

This aspect may include one or more of the following optional features. In some implementations, snapshotting the non-volatile memory state includes suspending garbage collection of the non-volatile memory. Snapshotting the volatile memory state may include executing a live migration of the volatile memory. In some examples, the threshold period of time is configurable by the user of the virtual machine. Optionally, the indication of compromise is based upon existence of a suspicious process and the threshold period of time is based upon the existence of the suspicious process.

In some implementations, the threshold period of time corresponds to the life of the virtual machine. Optionally, the data further includes a list of all commands executed by the virtual machine during the heightened level of auditing. In some examples, the operations further include determining that the attack has concluded and in response to determining that the attack has concluded, snapshotting the volatile-memory state of the volatile-memory used by the virtual machine and the non-volatile memory state of the non-volatile memory used by the virtual machine.

Receiving the indication of compromise may include receiving the indication of compromise from an intrusion detection system executing on the data processing hardware. The intrusion detection system may execute in a first hierarchical protection domain and software resources within a user space of the virtual machine may execute in a second hierarchical protection domain. The first hierarchical protection domain has more privileges than the second hierarchical protection domain. In some examples, the first hierarchical protection domain corresponds to ring 0 of the virtual machine and the second hierarchical protection domain corresponds to ring 3 of the virtual machine. In some implementations, no snapshotting of the volatile-memory state of the volatile-memory and the non-volatile memory state of the non-volatile memory occurs while the attack against the virtual machine is in progress.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Capturing snapshots of the state of memory (both volatile and non-volatile) is a common approach for recovering or analyzing a malicious software attack on a computer system. These snapshots capture the state of every bit of some or all of memory (i.e., like taking a "picture" of the memory). As modern computers make use of substantial amounts of memory, snapshots are quite expensive in both processing power and storage space. Therefore, it is desirable to only capture a snapshot when needed. However, modern protection systems tend to capture snapshots at regular intervals with the intent to "rollback" to a previous snapshot if and when an attack is detected. However, and in addition to the large amount of processing and storage that is potentially wasted on snapshots that are never used and the complicated lifecycle the snapshots require (e.g., when to delete), a clever attack that performs its function and erases itself (or otherwise hide its tracks) in between the snapshot interval may never be detected or analyzed. Even systems that can detect an attack in near real-time fail to produce detailed forensic data immediately before and after an attack which may complicate any incidence response. It is advantageous to minimize the number of snapshots needed and to capture incremental changes to memory whenever possible with a system fully integrated into the virtual machine.

Implementations herein are directed toward a system and method for capturing virtual machine (VM) resources for forensic analysis and/or recovery. A forensics manager detects when an attack from malicious software is imminent. In response, and before the attack begins, the forensics manager captures a snapshot of the current state of volatile and non-volatile memory. The forensics manager also increases a level of auditing from a standard level to a heightened level. The heightened level of auditing will capture all commands during the attack that indicates the behavior of the attack. After the forensics manager detects that the attack has concluded, the forensics manager captures a second resource snapshot of memory and may decrease the level of auditing from the heightened level back to the standard level.

Figure 1:
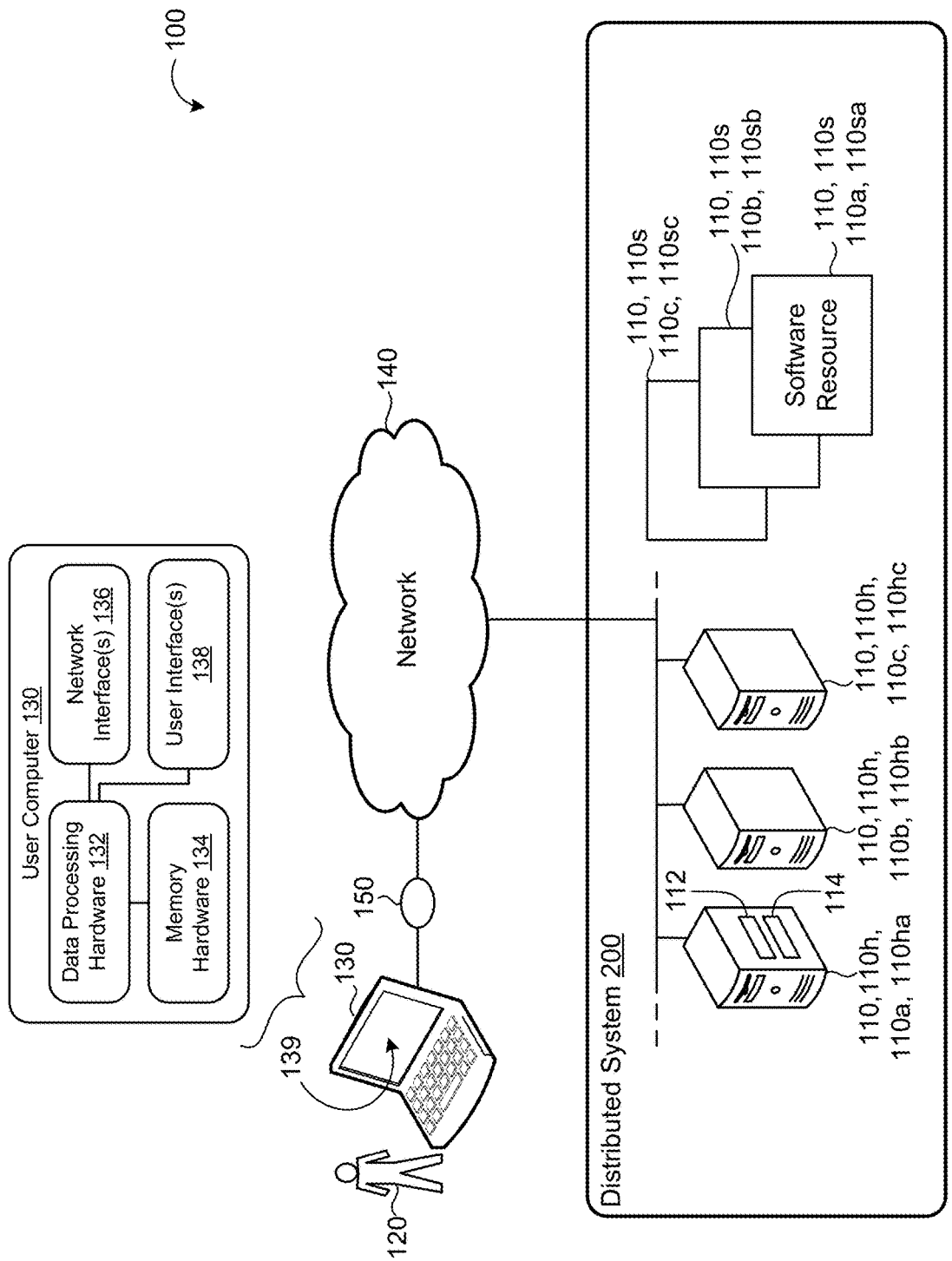
FIG. 1 is a schematic view of an example distributed system having scalable resources.

FIG. 1 illustrates an example system 100 that includes a distributed system 200 configured to execute resources 110. A user computer 130 associated with a user 120 may access the distributed system 200 over a network 140. In the example shown, the user computer 130 includes data processing hardware 132 in communication with memory hardware 134, a network interface device 136, and a user interface 138. The memory hardware 134 (e.g., random access memory (RAM), read-only memory (ROM), hard disk drive (HDD), solid state drive (SDD), and/or flash memory) stores instructions that when executed on the data processing hardware 132 cause the data processing hardware 132 to perform one or more operations. The memory hardware 134 may store computer readable instructions that make up a native application, a web browser, and/or an operating system (OS). The OS acts as an interface between the data processing hardware 132 and the executed applications. The network interface device 136 includes one or more devices configured to communicate with the network 140. The user interface 138 includes one or more devices configured to receive input from and/or provide output to the user 120. The user interface 138 can include, but is not limited to, a touchscreen, a display, a QWERTY keyboard, a numeric keypad, a touchpad, a microphone, and/or speakers. The data processing hardware 132 may execute a graphical user interface (GUI) 139 for display on the user computer 130.

The distributed system 200 may run one or more client services, such as, but not limited to a computing engine, a search engine, email services, video sharing services, and other services. In some implementations, the distributed system 200 includes resources 110, which may include hardware resources 110h and/or software resources 110s. The hardware resources 110h may include data processing devices 112 (also referred to as computing devices) and memory hardware 114 (e.g., non-transitory memory, persistent disks). The software resources 110s may include software applications, software services, application programming interfaces (APIs) or the like. The software resources 110s may reside in the hardware resources 110h. For example, the software resources 110s may be stored in the non-transitory memory 114 and executed by one or more data processing devices 112.

Figure 2:
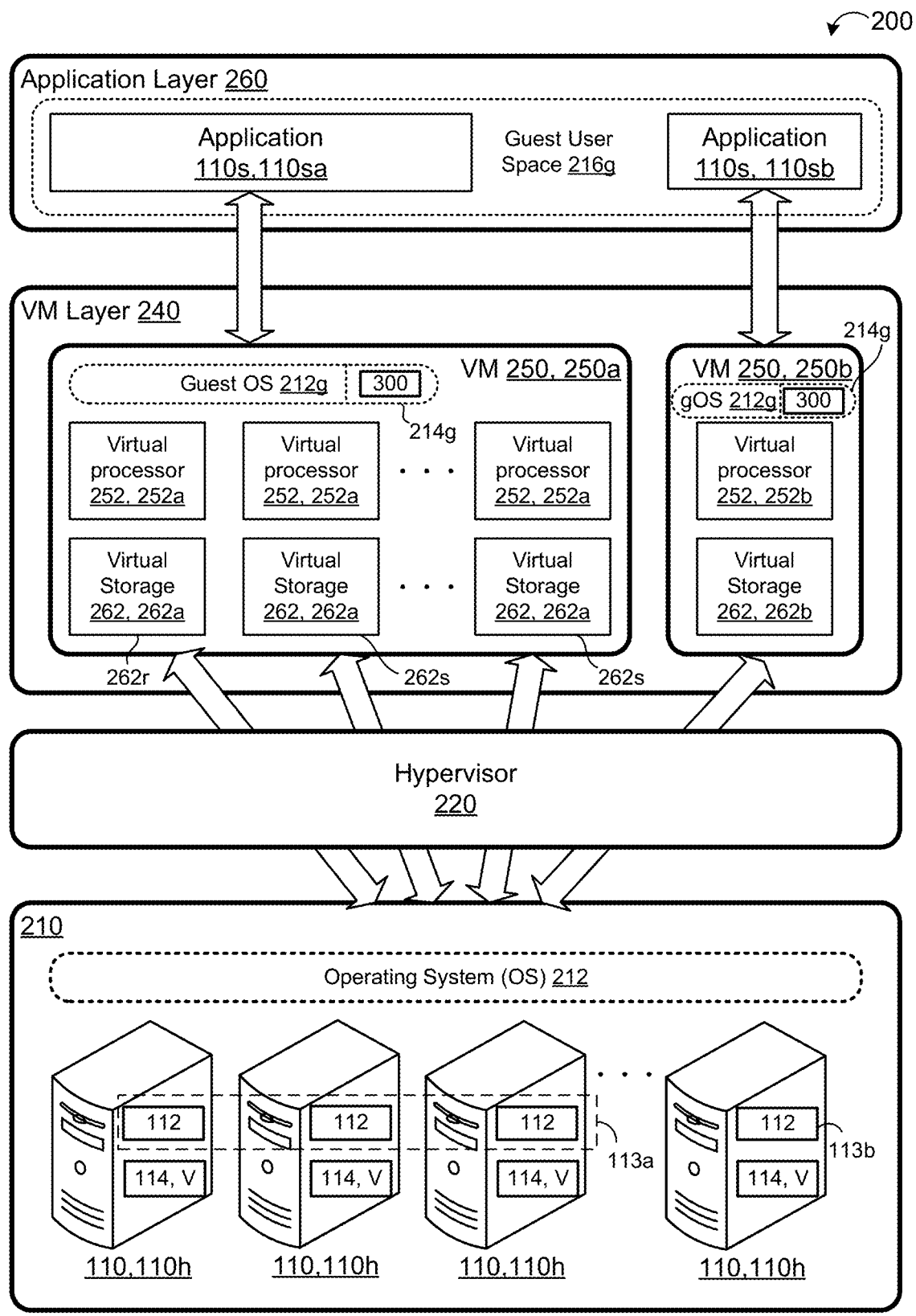
FIG. 2 is a schematic view of an example application layer and virtual machine layer hosted on a distributed system.

In the example shown in FIG. 2, the distributed system 200 includes a collection 210 of resources 110 (e.g., hardware resources 110h), a virtual machine monitor (VMM) 220, a VM layer 240 executing one or more virtual machines (VMs) 250, and an application layer 260. Each hardware resource 110h may include one or more physical central processing units (pCPU) 112 ("physical processor 112") and memory hardware 114. While each hardware resource 110h is shown having a single physical processor 112, any hardware resource 110h may include multiple physical processors 112. An operating system 212 may execute on the collection 210 of resources 110.

In some examples, the VMM 220 corresponds to a hypervisor 220 (e.g., a Compute Engine) that includes at least one of software, firmware, or hardware configured to create and execute the VMs 250. A computer (i.e., data processing hardware 112) associated with the VMM 220 that executes the one or more VMs 250 may be referred to as a host machine, while each VM 250 may be referred to as a guest machine. Here, the VMM 220 or hypervisor is configured to provide each VM 250 a corresponding guest operating system (OS) 212g having a virtual operating platform and manage execution of the corresponding guest OS 212g on the VM 250. As used herein, each VM 250 may be referred to as an "instance" or a "VM instance". In some examples, multiple instances of a variety of operating systems may share virtualized resources. For instance, a first VM 250 of the Linux® operating system, a second VM 250 of the Windows® operating system, and a third VM 250 of the OS X® operating system may all run on a single physical x86 machine.

The VM layer 240 includes one or more virtual machines 250. The distributed system 200 enables the user 120 to launch VMs 250 on demand. A VM 250 emulates a real computer system and operates based on the computer architecture and functions of the real computer system or a hypothetical computer system, which may involve specialized hardware, software, or a combination thereof. In some examples, the distributed system 200 authorizes and authenticates the user 120 before launching the one or more VMs 250. An instance of software, or simply an instance, refers to a VM 250 hosted on (executing on) the data processing hardware 112 of the distributed system 200.

Each VM 250 may include one or more virtual central processing units (vCPUs) 252 ("virtual processor"). In the example shown, a first virtual machine 250a includes a first set 252a of one or more virtual processors 252 and a second virtual machine 250b includes a second set 252b of one or more virtual processors 252. While the second set 252b is shown as only including one virtual processor 252, any number of virtual processors 252 is possible. Each virtual processor 252 emulates one or more physical processors 112. For example, the first set 252a of the one or more virtual processors 252 emulates a first set 113a of one or more physical processors 112, and the second set 252b of the one or more virtual processors 252 emulates a second set 113b of one or more physical processors 112. The application layer 260 includes software resources 110s, 110sa, 110sb (software applications) that may execute on the virtual machine(s) 250.

Typically, each instance of software (e.g., a virtual machine 250) includes at least one virtual storage device 262 that provides volatile and non-volatile storage capacity for the service on the physical memory hardware 114. For instance, the storage capacity on the physical memory hardware 114 can include persistent disks (PD) that store data for the user 120 across several physical disks (e.g., memory regions 116 (FIG. 10) of the memory hardware 114 or random access memory (RAM) to provide volatile memory. More specifically, each virtual storage device 262 of a corresponding VM 250 moves data in sequences of bytes or bits (blocks) to an associated physical block storage volume V on the memory hardware 114 to provide non-volatile storage. Accordingly, a virtual storage device 262 of a corresponding VM instance 250 provides a storage capacity that maps to corresponding physical block storage volumes V on the memory hardware 114. In some examples, the virtual storage devices 262 support random access to the data on the memory hardware 114 and generally use buffered I/O. Examples include hard disks, CD-ROM drives, and flash drives. Similarly, portions of volatile memory (e.g., RAM) of physical memory hardware 114 may be divided across the virtual storage devices 262.

The one or more virtual storage devices 262 for each VM instance 250 may include a root disk 262r (e.g., root persistent disk) and one or more secondary storage disks 262s. The root disk 262r may include a root persistent disk that contains the guest operating system 212g for the VM instance 250, while the one or more secondary storage persistent disks 262 that provide additional storage capacity/space for the VM instance 250. In some implementations, the data processing hardware 112 automatically creates a corresponding root persistent disk 262r when the user 120 creates a VM instance 250. In other implementations, the user 120 creates a standalone root persistent disk 262r and attaches the standalone root persistent disk 262r to the VM instance 250 after creating the VM instance 250. The root persistent disk 262r may expose a block storage volume V with a default storage capacity (e.g., 10 GB) and subsequently allow the user 120 to resize (e.g., increase the storage capacity) the root persistent disk 262r to improve performance and provide additional storage operating system files for the VM instance 250. Additionally or alternatively, the user 120 may subsequently add one or more secondary storage disks 262s to provide additional data storage capacity for applications running on the VM instance 250 as needed. In the example shown in FIG. 2, the first VM 250a has a first collection 262a of virtual storage devices 262, 262r, 262s that expose corresponding block storage volumes V and the second VM 250b includes a second collection 262b of one virtual storage device 262 exposing a corresponding block storage volume V.

Within the guest operating system 212g resides a guest kernel 214g. A kernel is a computer program that is the core of the operating system with full access and control over the OS. That is, the kernel is an intermediary between applications 110s and the hardware resources 110h of the host machine. Most modern computing systems segregate virtual memory into protected kernel space and user space 216g. The kernel typically remains in volatile memory within the protected kernel space and is isolated from user space 216g. To increase safety and reliability, applications 110s and other software services typically execute in the guest user space 216g and lack the privileges necessary to interact with the protected kernel space. In the example shown, the kernel 214g of each VM 250 includes a forensics manager 300.

Figure 3:
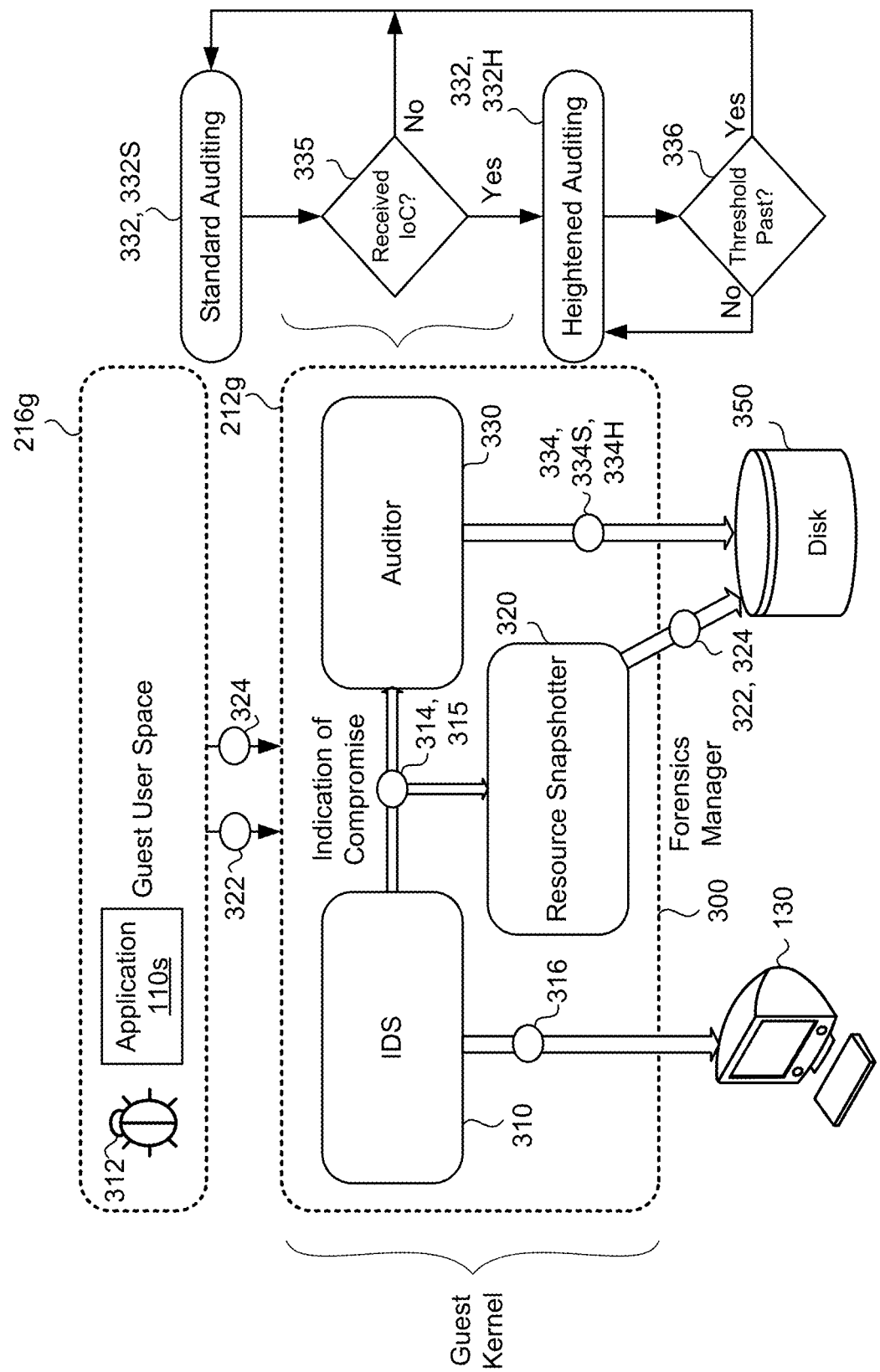
FIG. 3 is a schematic view of an example forensics manager.

Referring now to FIG. 3, in some implementations, the forensics manager 300 executing on a corresponding VM 250 within the corresponding guest kernel 214g includes an intrusion detection system (IDS) 310, a resource snapshotter 320, and an auditor 330. The IDS 310 monitors the guest user space 216g of the VM 250, which may be executing one or more software resources 110s, for aberrant behavior that indicates an imminent attack 312 from malicious software. The IDS 310 may monitor processes executing within the guest user space 216g, file transfers, privilege changes, etc. For example, the IDS 310 may flag a process that downloads data when that process typically does not download data, a process that opens a file that the process normally does not access, or other anomalous behavior. When the IDS 310 detects behavior indicating an imminent attack 312, the IDS 310 generates an indication of compromise (IoC) 314 that indicates that the attack 312 is imminent against the virtual machine 250. The attack 312 may take numerous forms, but generally the attack 312 is malicious software (malware) intentionally designed to cause harm to the computing system (e.g., deleting, stealing, or corrupting data). In some examples, the attack 312 may instead be an unintentional malfunctioning of software that may cause harm (as opposed to intentionally causing harm). In addition to the IoC 314, the IDS 310 may generate an attack notification 316 and send the attach notification 316 to the user computer 130 to warn the user 120 of the imminent attack 312. The notification 316 may take any number of forms. For example, the IDS 310 may send an email or issue findings in a security application. For instance, the notification 16 may indicate the software resource(s) 110s and/or the VM 250 affected by the attack 312.

After generating the IoC 314, the IDS 310 provides the IoC 314 to the resource snapshotter 320 and the auditor 330. In response to receiving the IoC 314 and prior to commencement of the attack against the VM 250, the snapshotter 320 is configured to snapshot a volatile memory state 322 of the volatile memory of the VM 250 and a non-volatile memory state 324 of non-volatile memory of the VM 250 (e.g., the virtual storage device 262). That is, before the attack 312 has the opportunity to achieve any goals of significance, the resource snapshotter 320 captures the complete pre-attack state 322, 324 of both the volatile memory and the non-volatile memory (i.e., the status of each bit of memory). These states 322, 324 provide an initial starting point for recovery and forensic analysis of the attack 312. Capturing the states 322, 324 may take advantage of other already present features of the VM 250. For example, a VM 250 may create a log of changes to non-volatile memory and regularly use garbage collection services to prune the log to only the most recent values in non-volatile memory. A method of capturing the state of non-volatile memory 324 in this example is to suspend garbage collection until the changes are permanently stored. For volatile memory, the resource snapshotter 320 may use a tool such as live migration, which typically is the process for moving a running VM 250 to a different physical machine without disconnecting any clients or applications. Live migration, by necessity, copies the volatile memory state 322 of the running VM before transferring and such a feature may be coopted, in some implementations, by the resource snapshotter 320.

The memory states 322, 324, upon capture by the resource snapshotter 320, are immediately exported to external datastore 350 (e.g., storage source 114). That is, the states 322, 324 are transferred as soon as possible after capture out of the VM 250 to a location inaccessible by the guest user space 216g, and thus out of the reach of the attack 312. In this way, the forensics manager 300 ensures that the attack 312 cannot alter or affect the captured states 322, 324.

Figure 4:
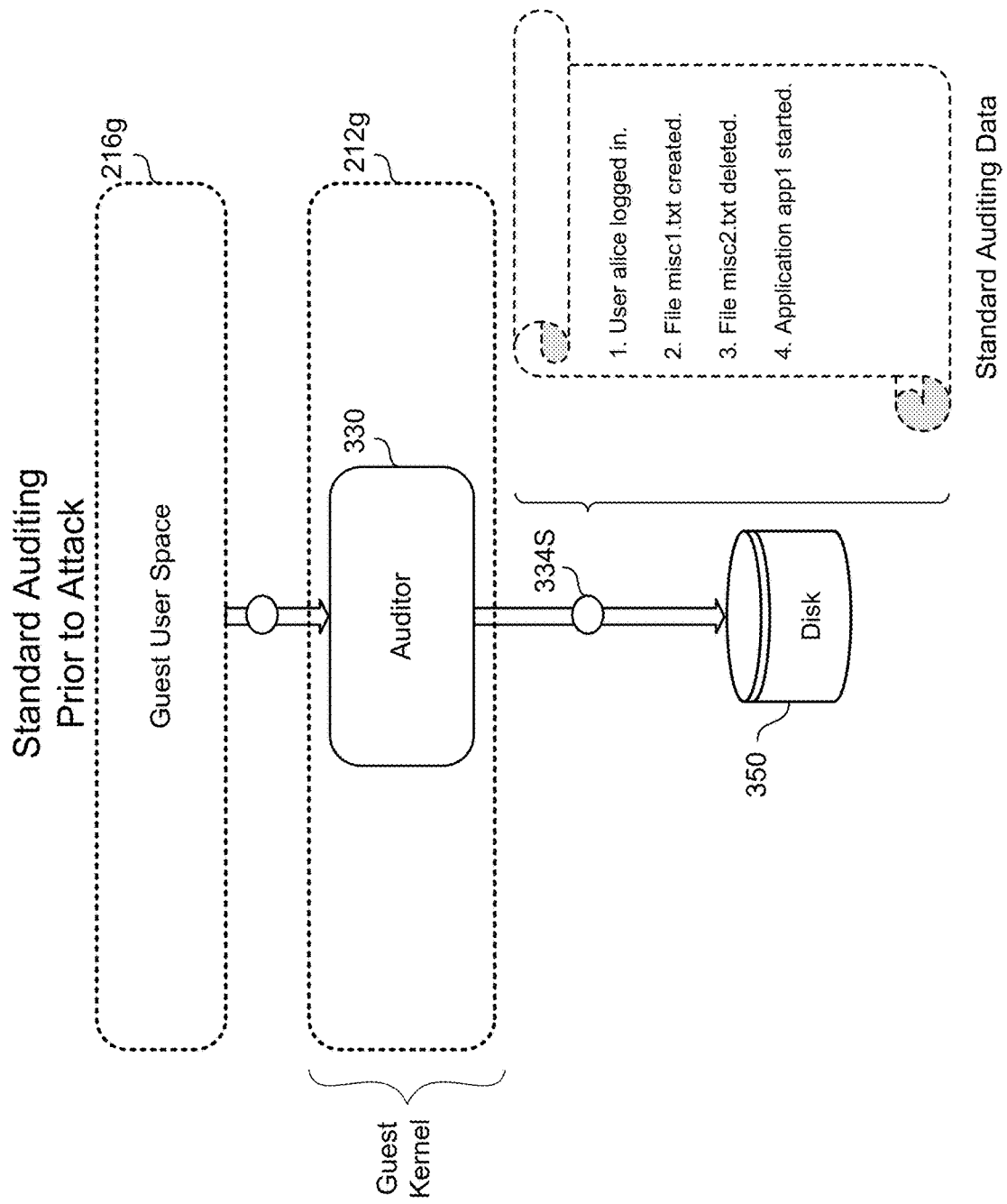
FIG. 4 is a schematic view of an auditor of the forensics manager and standard auditing data.

The auditor 330 is configured to control a current level of auditing 332 of the VM 250. The current level of auditing 332 controls an amount of auditing, monitoring, and/or logging that the VM 250 experiences. As the level of auditing 332 increases/heightens, the performance loss (i.e., processing and memory resources) similarly increases. Therefore, during normal or nominal operation, the VM 250 may operate with a standard level of auditing 332S that incurs only a minor performance loss. For example, during normal operation (i.e., no attack 312 is imminent), FIG. 4 shows a schematic view 400 of the auditor 330 applying the standard level of auditing 332 by performing minor or moderate auditing that includes logging login information, network connections, file creation and deletion, etc. experienced by the VM 250. However, in order to avoid negatively impacting performance, the standard level of auditing 332S will not include fine granularity auditing such as logging all low-level commands that read or write memory. The standard level of auditing generates auditing data 334, 334S. In some examples, the auditing data 334S, which may be structured, is passed to the datastore 350.

Figure 5:
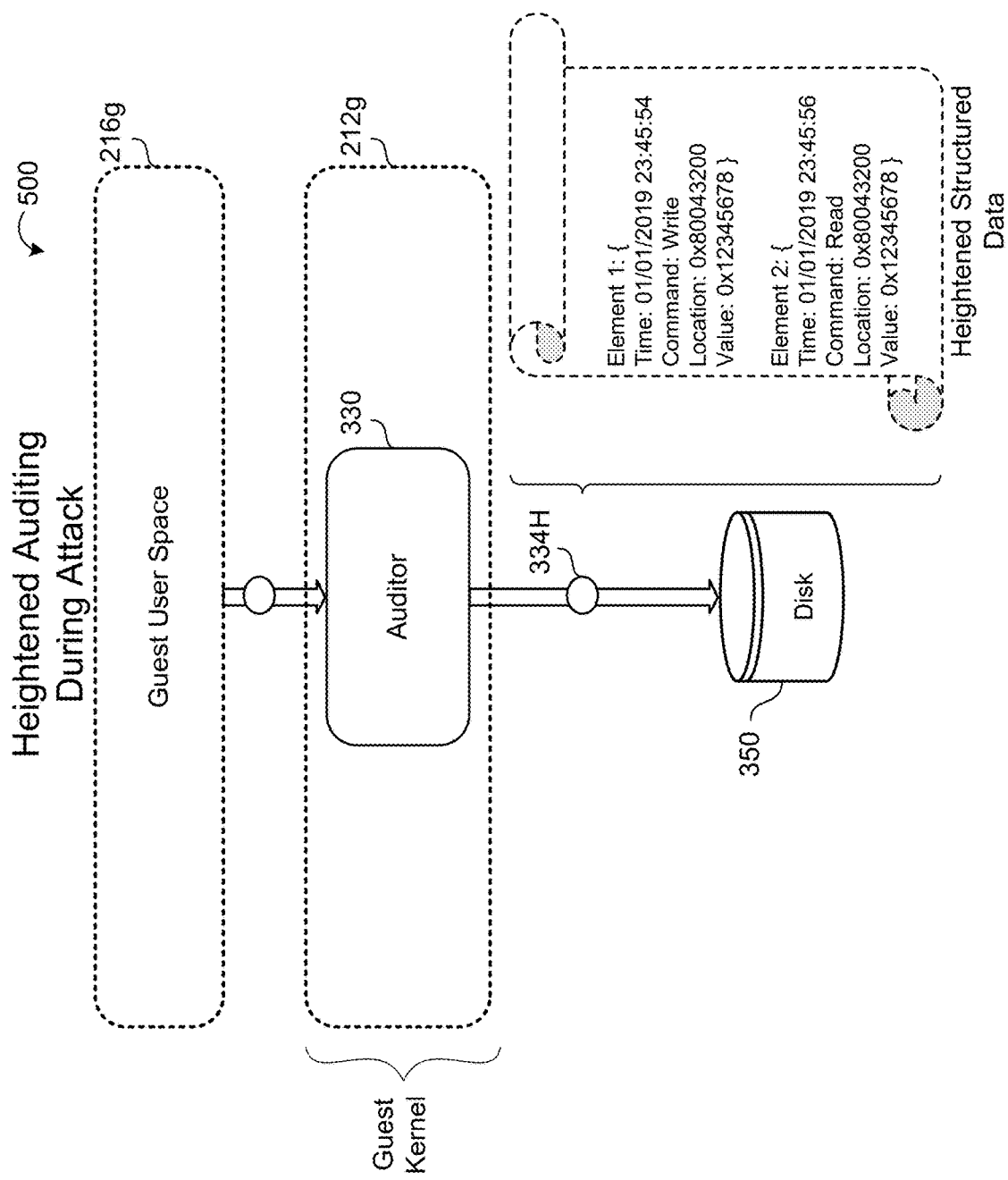
FIG. 5 is a schematic view of the auditor of the forensics manager and heightened structured data.

In some implementations, the auditor 330 at operation 335, determines if an IoC 314 has been received. If the auditor 330 has not received an IoC 314, then the auditor maintains standard auditing 332S. However, in response to receiving an IoC 314 (i.e., an attack 312 is imminent), the auditor 330 may increase the current level of auditing 332 to a heightened level of auditing 332H. The heightened level of auditing 332H is a higher level of auditing than the standard level of auditing 332S. That is, the heightened level of auditing 332H will log data at a higher granularity, in a greater quantity, and/or with more parameters than the standard level of auditing 332H. In some implementations, the heightened level of auditing 332H generates data 334H representative of all accesses to volatile-memory and non-volatile memory 262 used by the VM 250 during the period of heightened auditing. For example, FIG. 5 shows a schematic view 500 of the auditor 330 applying the heightened level of auditing 332H by generating data 334H that logs each memory access to the VM 250, including the time, type, location, and any associated values. In some examples, the data 334H is structured. That is, the structured data 334H may be organized data in a standardized format that is easily stored, queried, and analyzed. In the example shown in FIG. 5, the structured data 334H is considerably more detailed than the auditing data 334S obtained during the standard level of auditing 332S by providing a list or array (or any other data structure) of all the commands (e.g., read/write) to the corresponding VM 250 captured by the auditor 330 during the attack 312. In other examples, the data is generated and stored in an unstructured format. The data 334H, in some implementations, is exported immediately (or shortly thereafter) to the datastore 350 external to the VM 250.

Referring back to FIG. 3, in some implementations, the auditor 330 will maintain the heightened level of auditing 332H for a threshold period of time at operation 336. The threshold period of time may be based on a fixed amount of time (e.g., ten minutes). The threshold period of time may also be based upon the attack 312. For example, the auditor 330 may maintain the heightened level of auditing 332H until the attack completes (e.g., a process associated with the attack terminates) or for some fixed amount of time after. That is, the IoC 314 may be based upon a suspicious process executing in the user space 216g, and the threshold period of time may be based upon the existence of the suspicious process. In yet other examples, the threshold period of time is permanent. That is, the VM 250 may maintain the heightened level of auditing 332H for the life of the VM 250 (e.g., until the VM 250 terminates). The threshold period of time may be user configurable among these or any other appropriate options to ensure sufficient data is captured for forensics use. Once the threshold period of time has been satisfied, the auditor 330 may return to the standard level of auditing 332S.

In some implementations, the IDS 310 determines that the attack 312 has concluded. For example, the attack 312 may be associated with a specific process that terminates. In response to determining that the attack has concluded, the IDS 310 sends an attack complete notification 315 to the resource snapshotter 320 and/or the auditor 330. The resource snapshotter 320, in response to receiving the attack complete notification 315 from the IDS 310, snapshots the volatile and non-volatile states 322, 324 and exports the states to the datastore 350. Thus, the forensics manager 300, using the pre-attack snapshot, the post-attack snapshot, and the data 334H captured while the attack is in progress (i.e., the accesses to memory), may reconstruct the memory state of the VM 250 at any point during the attack, while the exact behavior and effect may be analyzed at any time after. For example, the pre-attack snapshot may log a value at a specific memory address. The data 334H may show that the memory address was written with a new value during the attack and then re-written with the original value shortly thereafter to obfuscate the occurrence of the attack. In such a case, mere intermittent snapshots would likely miss that the memory was every changed and a clever or well-timed attack could successfully hide its tracks. However, the data 334H ensures that the exact effect of the attack 312 is documented (e.g., the data 334H would log both memory writes) and simultaneously keeps expensive snapshotting to a minimum. In some implementations, no snapshotting of the volatile memory state 322 and the non-volatile memory state 324 occurs while the attack 312 against the VM 250 is in progress.

Figure 6:
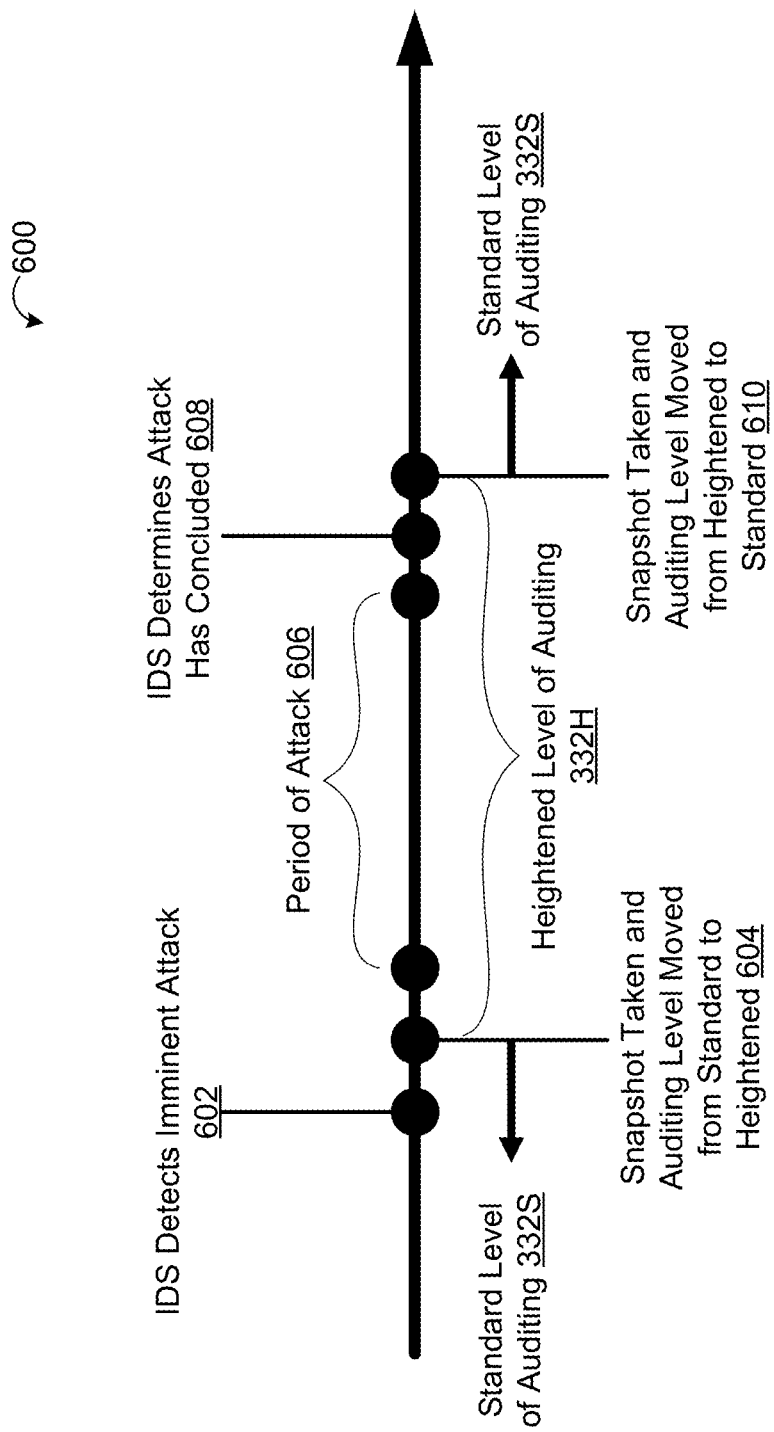
FIG. 6 is a plot of a timeline for capturing virtual machine resources for forensics.

Referring now to FIG. 6, a plot 600 of a timeline for capturing virtual machine resources by the forensics manager 300 for forensics shows that the forensics manager 300 minimizes the number of snapshots captured while simultaneously capturing data 334H at sufficient granularity to fully reconstruct every step of the attack 312. The plot 600 may be described with reference to FIGS. 3-5. The plot 600 depicts time increasing from left to right relative to the view of FIG. 6. For example, at time 602 the IDS 310 detects an imminent attack 312, and at time 604, the resource snapshotter 320 captures the volatile and non-volatile memory states 322, 324 and the auditor 330 increases the level of auditing 332 from the standard level 332S to the heightened level 332H prior to the attack 312 beginning. Here, the IDS 310 issues the IoC 314 to the resource snapshotter 320 and the auditor 330 responsive to detecting the imminent attack 312 at time 602, thereby causing the snapshotter 320 and the auditor 330 to capture the memory states 322, 324 and increase the level of auditing 332, respectively. During a period of attack 606 while the attack 312 against the VM 250 is in progress, no snapshots are necessary, as the auditor 330 captures data 334H capable of reconstructing the state of memory at any point during the attack 312. The IDS 310 may issue an attack complete notification 315 to the resource snapshotter 320 and/or the auditor 330 when the IDS 310 determines that the attack 312 has concluded at time 608. Responsive to receiving the attack complete notification 315, the resource snapshotter 320 again captures the state of volatile memory 322 and non-volatile memory 324 at time 610. This snapshot may verify that all final post-attack memory state 322, 324 corroborates the data 334H obtained by the auditor 330 while applying the heightened level of auditing 332H. At time 610, the auditor 330 may also return the level of auditing 332 back to the standard level of auditing 322S. In other examples, the heightened level of auditing 322H is maintained for a threshold period of time after the attack 312 concludes or until the VM 250 terminates.

Figure 7:
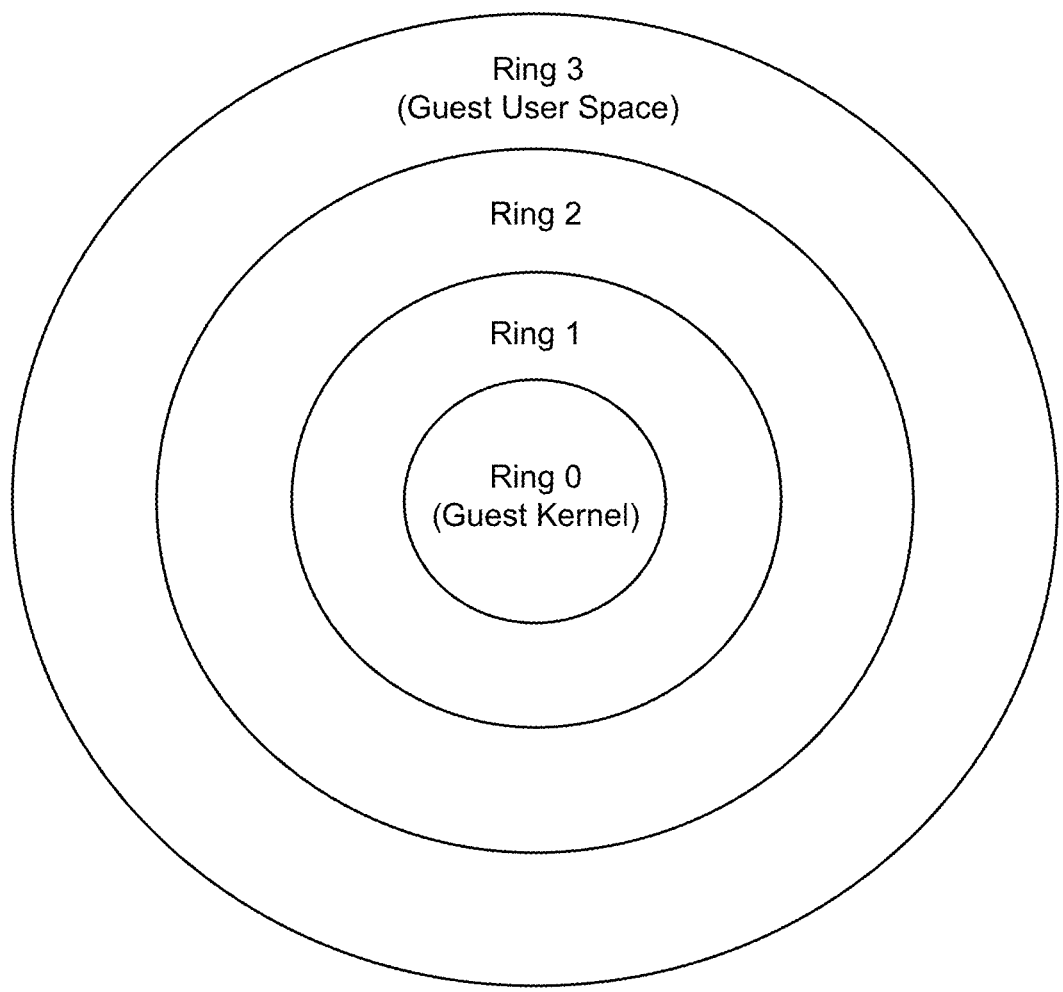
FIG. 7 is schematic view of a hierarchical protection domain system.

Referring now to FIG. 7, in many computer architectures, hierarchical protection domains (also referred to as protection rings) 700 protect against faults and malicious attacks by providing levels of privilege (i.e., access to resources) within each domain. Commonly, these hierarchical protection domains are referred to as Rings 0, 1, 2, and 3. Ring 3 generally corresponds to user space, and has the least privileges, or access to resources, while Ring 0 corresponds to the kernel and has the most privileges. Thus, Ring 0 interacts most directly with resources 210 such as a virtual processor 252 and a virtual storage device 262 of a corresponding VM 250. Intermediary Rings 1 and 2 generally correspond to respective device drivers, whereby device drivers within Ring 1 have more privileges that the device drivers within Ring 2. In some examples, the forensics manager 300 (including the IDS 310, the resource snapshotter 320, and the auditor 330) execute in a first hierarchical protection domain (e.g., Ring 0) while software resources 110s within the user space 216g of the VM 250 execute in a second hierarchical protection domain (e.g., Ring 3) that has less privilege than the first hierarchical protection domain. For example, the forensics manager 300 may execute in Ring 0 while the software resources 110s within the user space 216g execute in Ring 3. Because an attack 312 typically inherits the privileges of the process being targeted by the attack 312 within the user space 216g, hardware-enforcing processes (e.g., user programs) in the user space 216g to run in Ring 3 will prevent successful attacks 312 in user space 216g from gaining sufficient privileges to access the guest kernel 214g protected by Ring 0. Even in cases when an attack 312 (e.g., spyware) attempts to escalate privileges to gain access to the guest kernel 214g within Ring 0, the IDS 310 executing on the guest kernel 214g within Ring 0 may detect such behavior and trigger an indication of compromise 314.

Portions of the forensics manager 300 may be included in or in communication with other components of the system without deviating from the scope or spirit of the invention. For example, portions of the IDS 310, the resource snapshotter 320, and/or the auditor 330 may be included in the VMM 220 (e.g., the Hypervisor 220). In some examples, instrumentation in the guest kernel 214g (i.e., the forensics manager 300) sends captured data (e.g., data 334H) to the VMM 220.

Figure 8:
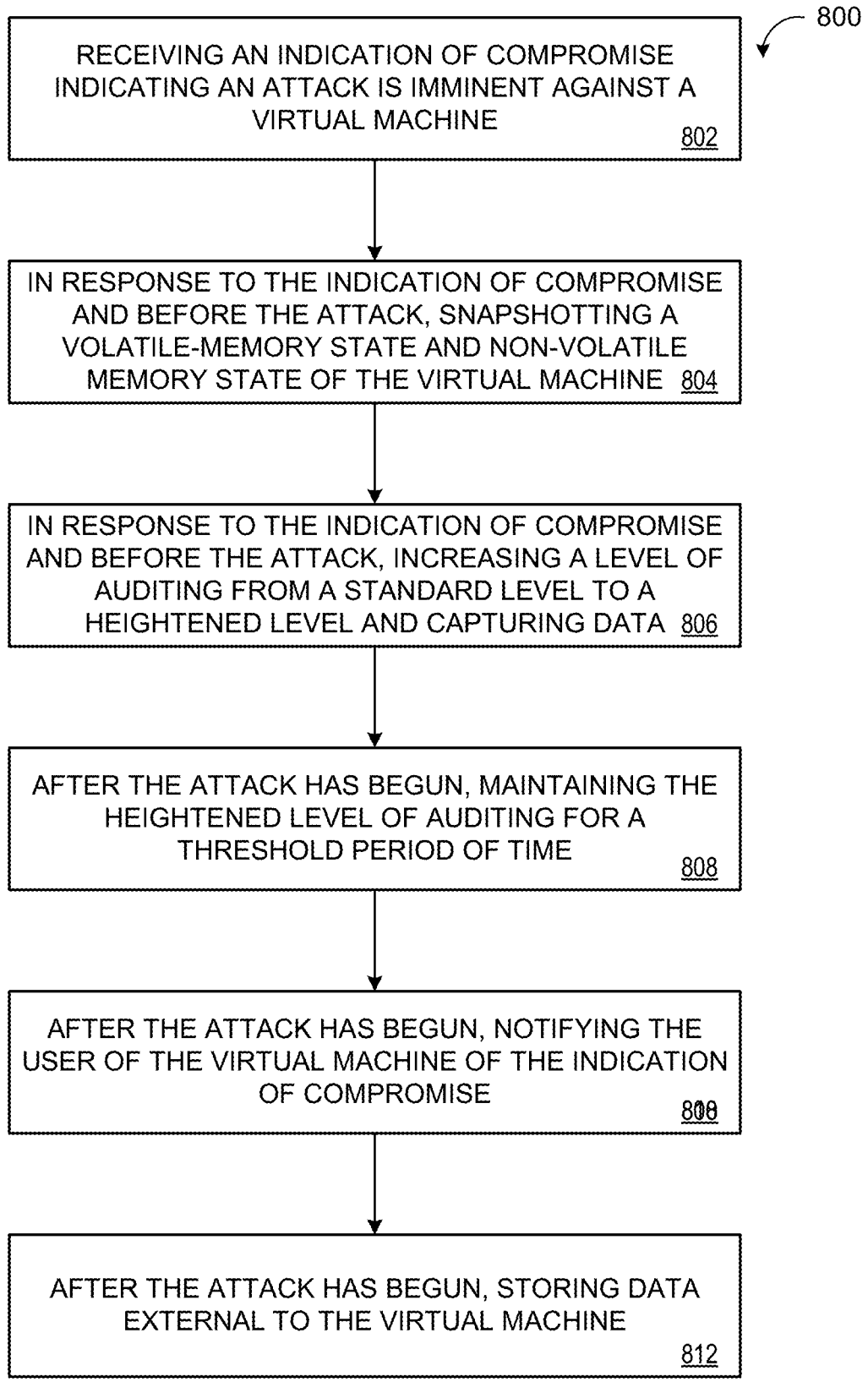
FIG. 8 is a schematic view of an example arrangement of operations for a method of capturing VM resources for forensics.

FIG. 8 is a flowchart of an exemplary arrangement of operations for a method 800 of capturing VM resources for forensics. At operation 802, the method includes receiving, at data processing hardware 910 (FIG. 9), an indication of compromise 314 indicating an attack 312 is imminent against a virtual machine 250. Here, the data processing hardware 910 may be associated with computing resources 112 and execute a corresponding forensic manager 300 within the guest kernel 214g of the virtual machine 250, wherein the forensic manager 300 includes a corresponding intrusion detection system 310, resource snapshotter 320, and auditor 330. The intrusion detection system 310 may detect that the attack 312 is imminent and issue the indication of compromise 314 to the snapshotter 320 and the auditor 330. The method 800 also includes, in response to receiving the indication of compromise 314 and before the attack 312 against the virtual machine 250 begins: snapshotting, by the data processing hardware 910, a volatile-memory state 322 of volatile-memory used by the virtual machine 250 and a non-volatile memory state 324 of non-volatile memory used by the virtual machine 250 at operation 804; and increasing, by the data processing hardware 910, a level of auditing 332 of the virtual machine 250 from a standard level of auditing 332S to a heightened level of auditing 332H at operation 806. The heightened level of auditing 332H generates data 334H representative of all accesses to the volatile-memory used by the virtual machine 250 and the non-volatile memory used by the virtual machine 250.

After the attack 312 against the virtual machine 250 has begun, the method 800 also includes, at operation 808, maintaining, by the data processing hardware 910, the heightened level of auditing 332H for a threshold period of time an notifying, by the data processing hardware 910, a user 120 of the virtual machine 250 of the indication of compromise 314 at operation 810. At operation 812, the method 800 also includes storing, by the data processing hardware 910, the data 334H in the datastore 350 external to the virtual machine 250.

The non-transitory memory (i.e., memory hardware) 114 may be physical devices used to store programs (e.g., sequences of instructions) or data (e.g., program state information) on a temporary or permanent basis for use by a computing device 112. The non-transitory memory 114 may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), and phase change memory (PCM).

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 9:
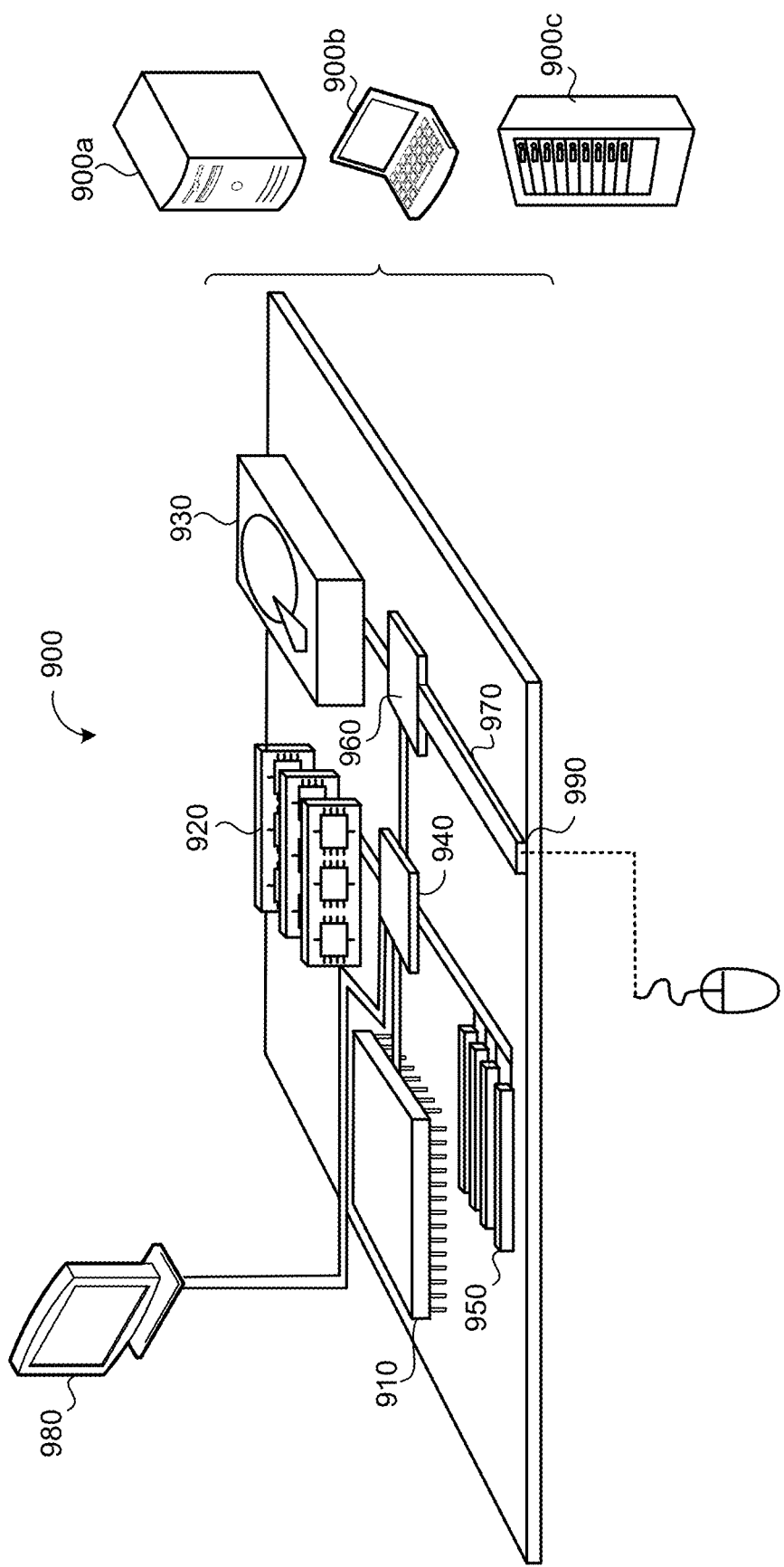
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 (e.g., data processing hardware) can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system). The processor 910 may execute the forensic manager(s) 300 of FIGS. 2 and 3.

The memory 920 (e.g. memory hardware) stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource 110s) may refer to computer software that causes a computing device to perform one or more tasks. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
    receiving, at data processing hardware, an indication of compromise, the indication of compromise indicating an attack is imminent against a virtual machine;
    in response to receiving the indication of compromise and before the attack against the virtual machine begins:
        snapshotting, by the data processing hardware, a pre-attack snapshot comprising:
            a volatile-memory state of volatile-memory used by the virtual machine; and
            a non-volatile memory state of non-volatile memory used by the virtual machine; and
        increasing, by the data processing hardware, a level of auditing of the virtual machine from a standard level of auditing to a heightened level of auditing, the heightened level of auditing generating data representative of all accesses to:
            the volatile-memory used by the virtual machine; and
            the non-volatile memory used by the virtual machine;
    during the attack against the virtual machine, maintaining, by the data processing hardware, the heightened level of auditing for a threshold period of time;
    notifying, by the data processing hardware, a user of the virtual machine of the indication of compromise;
    storing, by the data processing hardware, the data in memory external to the virtual machine;
    determining the attack against the virtual machine has concluded; and
    after determining the attack against the virtual machine has concluded, reconstructing, by the data processing hardware, using the pre-attack snapshot and the data, a state of the virtual machine at a point in time during the attack against the virtual machine, the state of the virtual machine comprising:
        the volatile-memory state of the volatile-memory used by the virtual machine at the point in time; and
        the non-volatile memory state of the non-volatile memory used by the virtual machine at the point in time.

2. The method of claim 1, wherein snapshotting the non-volatile memory state of the pre-attack snapshot comprises suspending garbage collection of the non-volatile memory.

3. The method of claim 1, wherein snapshotting the volatile memory state of the pre-attack snapshot comprises executing a live migration of the volatile-memory.

4. The method of claim 1, wherein the threshold period of time is configurable by the user of the virtual machine.

5. The method of claim 1, wherein:
the indication of compromise is based upon existence of a suspicious process; and
the threshold period of time is based upon the existence of the suspicious process.

6. The method of claim 1, wherein the threshold period of time corresponds to the life of the virtual machine.

7. The method of claim 1, wherein the data further comprises a list of all commands executed by the virtual machine during the heightened level of auditing.

8. The method of claim 1, further comprising:
in response to determining that the attack against the virtual machine has concluded, snapshotting, by the data processing hardware, a post-attack snapshot comprising:
the volatile-memory state of the volatile-memory used by the virtual machine; and
the non-volatile memory state of the non-volatile memory used by the virtual machine.

9. The method of claim 1, wherein receiving the indication of compromise comprises receiving the indication of compromise from an intrusion detection system executing on the data processing hardware.

10. The method of claim 9, wherein the intrusion detection system executes in a first hierarchical protection domain and software resources within a user space of the virtual machine executes in a second hierarchical protection domain, the first hierarchical protection domain having more privileges than the second hierarchical protection domain.

11. The method of claim 10, wherein the first hierarchical protection domain corresponds to Ring 0 of the virtual machine and the second hierarchical protection domain corresponds to Ring 3 of the virtual machine.

12. The method of claim 1, wherein no snapshotting of the volatile-memory state of the volatile-memory and the non-volatile memory state of the non-volatile memory occurs while the attack against the virtual machine is in progress.

13. A system comprising:
data processing hardware; and
memory hardware in communication with the data processing hardware, the memory hardware storing instructions that when executed on the data processing hardware cause the data processing hardware to perform operations comprising:
receiving an indication of compromise from an intrusion detection system monitoring a virtual machine, the indication of compromise indicating an attack is imminent against the virtual machine;
in response to receiving the indication of compromise and before the attack against the virtual machine begins:
snapshotting a pre-attack snapshot comprising:
a volatile-memory state of volatile-memory used by the virtual machine; and
a non-volatile memory state of non-volatile memory used by the virtual machine; and
increasing a level of auditing of the virtual machine from a standard level of auditing to a heightened level of auditing, the heightened level of auditing generating data representative of all accesses to the volatile-memory used by the virtual machine and the non-volatile memory used by the virtual machine;
during the attack against the virtual machine, maintaining the heightened level of auditing for a threshold period of time;
notifying a user of the virtual machine of the indication of compromise;
storing the data in memory external to the virtual machine;
determining the attack against the virtual machine has concluded; and
after determining the attack against the virtual machine has concluded, reconstructing, using the pre-attack snapshot and the data, a state of the virtual machine at a point in time during the attack against the virtual machine, the state of the virtual machine comprising:
the volatile-memory state of the volatile-memory used by the virtual machine at the point in time; and
the non-volatile memory state of the non-volatile memory used by the virtual machine at the point in time.

14. The system of claim 13, wherein snapshotting the non-volatile memory state of the pre-attack snapshot comprises suspending garbage collection of the non-volatile memory.

15. The system of claim 13, wherein snapshotting the volatile memory state of the pre-attack snapshot comprises executing a live migration of the volatile-memory.

16. The system of claim 13, wherein the threshold period of time is configurable by the user of the virtual machine.

17. The system of claim 13, wherein:
the indication of compromise is based upon existence of a suspicious process; and
the threshold period of time is based upon the existence of the suspicious process.

18. The system of claim 13, wherein the threshold period of time corresponds to the life of the virtual machine.

19. The system of claim 13, wherein the data further comprises a list of all commands executed by the virtual machine during the heightened level of auditing.

20. The system of claim 13, wherein the operations further comprise:
in response to determining that the attack against the virtual machine has concluded, snapshotting a post-attack snapshot comprising:
the volatile-memory state of the volatile-memory used by the virtual machine; and
the non-volatile memory state of the non-volatile memory used by the virtual machine.

21. The system of claim 13, wherein receiving the indication of compromise comprises receiving the indication of compromise from an intrusion detection system executing on the data processing hardware.

22. The system of claim 21, wherein the intrusion detection system executes in a first hierarchical protection domain and software resources within user space of the virtual machine executes in a second hierarchical protection domain, the first hierarchical protection domain having more privileges than the second hierarchical protection domain.

23. The system of claim 22, wherein the first hierarchical protection domain corresponds to Ring 0 of the virtual machine and the second hierarchical protection domain corresponds to Ring 3 of the virtual machine.

24. The system of claim 13, wherein no snapshotting of the volatile-memory state of the volatile-memory and the non-volatile memory state of the non-volatile memory occurs while the attack against the virtual machine is in progress.

\* \* \* \* \*